INVENTOR.
Erwin R. Stoekle
BY Frank H Hubbard
ATTORNEY.

Patented July 29, 1924.

1,503,213

UNITED STATES PATENT OFFICE.

ERWIN R. STOEKLE, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed May 15, 1919. Serial No. 297,271.

*To all whom it may concern:*

Be it known that I, ERWIN R. STOEKLE, a citizen of the United States, residing at Milwaukee, in the county of Milwaukee and State of Wisconsin, have invented new and useful Improvements in Motor Controllers, of which the following is a full, clear, concise, and exact description, reference being had to the accompanying drawing, forming a part of this specification.

This invention relates to improvements in motor controllers and is particularly applicable to controllers for induction motors.

One object of the invention is to provide means enabling smooth acceleration and deceleration of the controlled motor, such means obviating the necessity of using switches heretofore required.

A further object of the invention is to provide means of the aforesaid character enabling quick and safe reversal of the controlled motor by plugging.

Other objects and advantages of the invention will hereinafter appear.

The accompanying drawing illustrates certain embodiments of the invention and the same will now be described, it being understood that the invention may be embodied in other forms without departing from the scope of the appended claims.

Figure 1:
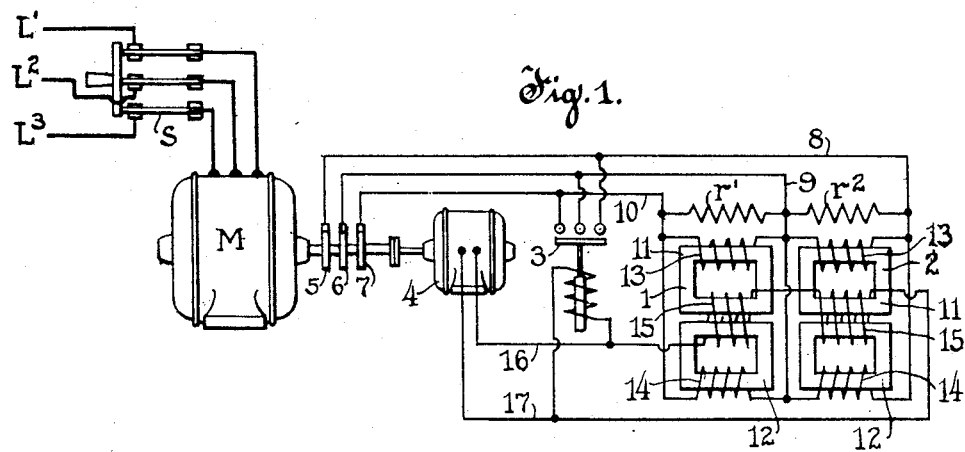
Figure 1 is a diagrammatic view of a non-reversing controller.

Referring to Fig. 1, the same illustrates an induction motor M having its stator supplied from a circuit $L'$, $L^2$, $L^3$ through a knife switch S and further illustrates control means for the rotor of said motor including resistance $r'$ and $r^2$, magnetic amplifiers 1 and 2 associated with said resistances, an electromagnetic switch 3 for short circuiting said rotor and a tachometer generator 4 driven by the motor to supply current to said magnetic amplifiers and the winding of said switch 3. The motor is provided with slip rings 5, 6 and 7, the slip rings 5 and 6 being respectively connected by conductors 8 and 9 to opposite terminals of resistance $r^2$ and the slip rings 6 and 7 being respectively connected by conductors 9 and 10 to opposite terminals of resistance $r'$ whereby open delta connections are provided.

The magnetic amplifiers 1 and 2 are of a conventional form each comprising two cores 11 and 12, inductive coils 13 and 14 wound thereon respectively and a direct current coil 15 wound on adjacent parts of both cores. The inductive coils 13 and 14 of each device are so wound that their fluxes thread the coil 15 in opposite directions at any instant with a consequent negligible effect of the fluxes of coils 13 and 14 upon coil 15. On the other hand, the flux of coil 15 threads both coils 13 and 14 whereby variation of the current supplied to coil 15 varies the inductance of coils 13 and 14, as is well understood. The coils 13 and 14 of the two devices are connected in the secondary circuit in a manner similar to the resistances, i. e., the coils of one device being connected in parallel between conductors 8 and 9 and those of the other device between conductors 9 and 10. On the other hand, the coils 15 of the two devices are connected in series to be supplied by the generator 4.

The generator 4 is of very small capacity and may be equipped with permanent field magnets when used in the control of small induction motors, or the same may be self excited or provided with a field supplied by a permanent magnet generator when used in the control of larger motors. The generator supplies current through conductors 16 and 17 to the coils 15 of the magnetic amplifiers and also to the operating winding of the switch 3, which winding is connected across conductors 16 and 17.

When current is first supplied to the motor for starting the resistances $r'$ and $r^2$ are included in the secondary circuit of said motor and the reactance of the coils 13 and 14 of the magnetic amplifiers is at a maximum, since the coils 15 are de-energized and the frequency of the induced current is initially the same as that of the line current. Thus with the reactance of said coils properly proportioned with respect to the resistance, the controller provides for full protection of the motor in starting and as the motor speeds up the frequency of the secondary current decreases while at the same time the generator 4 is operated to supply current to coils 15 of the magnetic amplifiers, both acting to decrease the reactance of coils 13 and 14 and hence curtailing the effect of the resistances. The motor is thereby permitted to accelerate and as the frequency of the secondary current decreases gradually while the current supplied by the tachometer generator increases gradually, an exceedingly smooth acceleration of the motor is insured. Ultimately the reactance of coils 13 and 14 is so minimized as to practically short circuit the E. M. F. of the rotor whereupon the switch 3, being properly adjusted, responds to the current supplied by the generator to short circuit the rotor. Thus the controller provides for acceleration of the motor and establishment of running connections without the use of any resistance controlling switches other than the single running switch 3.

Figure 2:
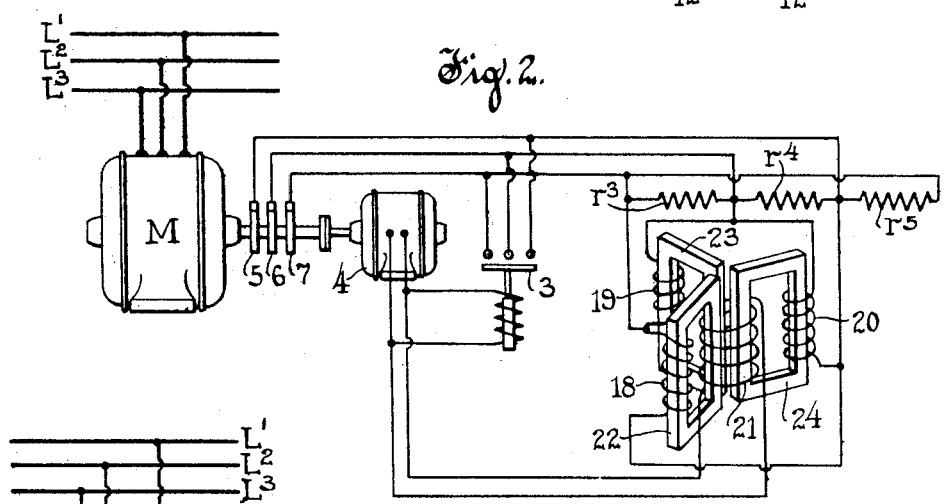
Fig. 2 is a diagrammatic view of a modified form of non-reversing controller; and, Fig. 3 is a diagrammatic view of a reversing controller.

Referring to Fig. 2, the motor shown therein is identical with that shown in Fig. 1, and the control means differs from that described only in the type of magnetic amplifier employed and in the number and arrangement of resistance sections employed. In this instance there are provided three resistances $r^3$, $r^4$ and $r^5$ which are connected in delta fashion in the secondary circuit of the motor. The magnetic amplifier in this instance comprises three inductive coils 18, 19 and 20 similarly connected in the secondary circuit and a single coil 21 to be supplied by the generator. The coils 18, 19 and 20 are wound on separate cores 22, 23 and 24 respectively, each of said cores having a portion threading the coil 21. Thus since the magnetic fluxes in these cores are displaced 120 degrees with respect to each other the electromotive forces which they induce in the coil 21 add up to zero at every instant, whereby the direct current in the latter coil controls the inductance of coils 18 to 20 without being influenced by the current in the latter coils. This controller functions in the same manner as that shown in Fig. 1.

Figure 3:
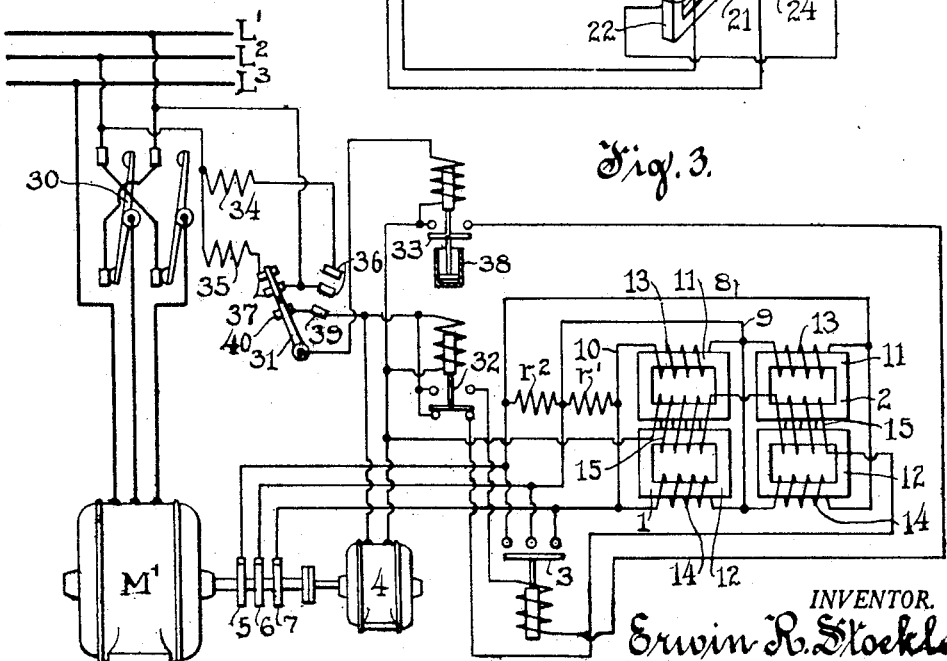

Referring to Fig. 3, there is shown a reversible motor M' and control means therefor similar to the means shown in Fig. 1 and designated by the same reference characters, such control means being supplemented by an electromagnetic reversing switch 30 for the primary of the motor, a master switch 31 and relays 32 and 33 for a purpose hereinafter set forth. Reversing switch 30 is of a conventional form being provided with operating windings 34 and 35 controllable by the master switch. In one position of the master switch, circuit is completed from line L' through contacts 36 thereof to and through winding 34 to line L², while in another position of said master switch circuit is completed from line L' through contacts 37 thereof to and through winding 35 to line L², whereby the reversing switch may be operated under control of the master switch for reversal of the motor at will.

The relay 32 is included in both the exciting circuit of the magnetic amplifier and the energizing circuit of the switch 3 and said relay when de-energized completes the former circuit, opening the latter circuit. On the other hand, when this relay is energized it interrupts the exciting circuit of the amplifier and closes the energizing circuit of switch 3. Accordingly, response of switch 3 is rendered dependent upon prior response and continued energization of said relay while a maximum inductance of the coils of the magnetic amplifiers is insured so long as the relay is maintained energized. The relay has its operating winding connected across the circuit of the generator and is designed to respond only when the generator is driven at a speed corresponding to normal speed of motor M' and to release only when the motor speed is decreased to a predetermined value.

The relay 33 is included only in the energizing circuit of switch 3 and is normally open to interrupt said circuit. Further, this relay is provided with a dash pot 38 for delaying its closure but without retarding opening thereof. The energizing circuit of this relay is supplied with current from the generator, this circuit being controlled by the master switch 31 for interruption thereof by said switch when operated for reversals of the motor. More specifically, the master switch is adapted to complete the energizing circuit of relay 33 either through its contact 39 or its contact 40 and to interrupt said circuit during its movement between forward and reverse positions.

In this form of controller, as in that shown in Fig. 1, the switch 3 is opened and the magnetic amplifier coils are de-energized when the motor M' is at rest whereby the motor is insured due protection in starting. Also, this controller provides for acceleration of the motor in the same manner as that above described and during initial acceleration of the motor the relay 33 responds to provide for energization of switch 3 when the motor attains normal speed and energizes relay 32.

If, after acceleration of the motor, the master switch is operated for reversal of the motor, it momentarily de-energizes relay 33 which in turn de-energizes switch 3 to reinclude the resistances in the secondary circuit of the motor. Reclosure of relay 33 is delayed for a definite interval by the dash pot and during such interval the relay 32 remains energized to interrupt the circuit of the magnetic amplifier coils 15 until the speed of the motor is reduced to a predetermined value. Accordingly during such period of deceleration the inductance of the magnetic amplifier coils is at a maximum. Also, during such period the frequency of the induced rotor current is in excess of that of the line frequency, the former decreasing from an initial value of almost twice the line frequency to a value equal to the line frequency when the motor is brought to a standstill. Thus the reactance of the coils 13 and 14 is very high relative to the resistances during the decelerating period whereby said resistances serve to limit the inrush of current when the motor is plugged and furthermore provide for a strong reversing torque by keeping the rotor current in proper phase relation to the stator fluxes. And as the motor accelerates in a reverse direction the voltage of the generator again increases causing the magnetic amplifiers and the relays to function as above described for effecting smooth acceleration of the motor to normal speed whereupon switch 3 is reclosed.

What I claim as new and desire to secure by Letters Patent is:

1. The combination with an alternating current motor, of reversing means therefor, resistance to protect the motor in starting and plugging thereof, variable inductance in parallel with said resistance and means for varying said inductance for varying the effect of said resistance upon the motor, said last mentioned means insuring a maximum value of said inductance when the motor is plugged.

2. The combination with an alternating current motor, of reversing means therefor, protecting resistance for the motor, variable inductance included in the motor circuit to vary the effect of said resistance upon the motor for acceleration of the latter means to exclude said resistance and inductance from the motor circuit for running, said last mentioned means insuring inclusion of said resistance in circuit when the motor is plugged and control means for said inductance insuring a maximum value thereof during plugging of the motor.

In witness whereof, I have hereunto subscribed my name.

ERWIN R. STOEKLE.